US011792889B2

(12) United States Patent
Damm et al.

(10) Patent No.: US 11,792,889 B2
(45) Date of Patent: Oct. 17, 2023

(54) DATA SHARING IN A MESH NETWORK

(71) Applicant: Itron, Inc., Liberty Lake, WA (US)

(72) Inventors: Benjamin Damm, Point Roberts, WA (US); Eric Donald White, Seneca, SC (US); Tommi Petteri Parkkila, Cary, NC (US)

(73) Assignee: Itron, Inc., Liberty Lake, WA (US)

( * ) Notice: Subject to any disclaimer, the term of this patent is extended or adjusted under 35 U.S.C. 154(b) by 63 days.

(21) Appl. No.: 17/304,471

(22) Filed: Jun. 22, 2021

(65) Prior Publication Data

US 2022/0408522 A1 Dec. 22, 2022

(51) Int. Cl.
*H04W 84/18* (2009.01)
*H04W 88/06* (2009.01)
*H04W 12/06* (2021.01)
*H04L 9/40* (2022.01)
*H04L 67/51* (2022.01)

(52) U.S. Cl.
CPC ......... *H04W 88/06* (2013.01); *H04L 63/0823* (2013.01); *H04L 67/51* (2022.05); *H04W 12/06* (2013.01)

(58) Field of Classification Search
CPC ... H04W 88/06; H04W 12/06; H04W 12/069; H04W 84/18; H04L 63/0823; H04L 67/51; H04L 67/55; H04L 67/56
USPC ....................................................... 370/329
See application file for complete search history.

(56) References Cited

U.S. PATENT DOCUMENTS

| 6,684,331 | B1 | 1/2004 | Srivastava |
| 7,606,175 | B1 * | 10/2009 | Maufer ................. H04W 8/005 370/255 |
| 2001/0033554 | A1 | 10/2001 | Ayyagari et al. |
| 2006/0174121 | A1 | 8/2006 | Omae et al. |
| 2008/0031203 | A1 | 2/2008 | Bill |
| 2009/0276841 | A1 | 11/2009 | Guo |
| 2010/0268943 | A1 | 10/2010 | Roy-Chowdhury et al. |

(Continued)

FOREIGN PATENT DOCUMENTS

| CN | 110912696 A | 3/2020 |
| WO | WO2016159954 A1 | 10/2016 |

OTHER PUBLICATIONS

Extended European Search Report dated Nov. 15, 2022 for European Patent Application No. 22180380.2, 7 pages.

(Continued)

*Primary Examiner* — Huy C Ho
(74) *Attorney, Agent, or Firm* — Lee & Hayes, P.C.

(57) ABSTRACT

Techniques are provided for ad-hoc authenticated group discovery and data sharing in a mesh network. A group of devices is created without leaving a security gap due to the open communication needed to establish the discovery of the devices forming the group. The group can be authenticated autonomously following network discovery of the devices. Instead of requiring global pre-assigned keys for authentication, the devices in the group are authenticated with signatures and certificate passing thereby providing strong security. The efficiency of data sharing between the devices of the network, such as a mesh network, can also be increased. One or more devices may act as a bridge device between devices of a same group that are not in direct wireless communication with each other to reduce re-broadcasts within the mesh network.

16 Claims, 12 Drawing Sheets

(56) References Cited

U.S. PATENT DOCUMENTS

| | | | |
|---|---|---|---|
| 2012/0146583 A1 | 6/2012 | Gaul et al. | |
| 2014/0269425 A1 | 9/2014 | Fisher et al. | |
| 2014/0368189 A1* | 12/2014 | Bernheim | G01R 22/066 |
| | | | 324/115 |
| 2016/0100305 A1 | 4/2016 | Karampatsis et al. | |
| 2016/0127976 A1* | 5/2016 | Kumar | H04W 4/02 |
| | | | 370/310 |
| 2016/0154040 A1 | 6/2016 | Driscoll | |
| 2018/0132015 A1* | 5/2018 | Borrelli | G06F 11/3006 |
| 2020/0186194 A1 | 6/2020 | Gilbert | |
| 2020/0304318 A1 | 9/2020 | Kravitz et al. | |
| 2022/0408257 A1 | 12/2022 | Damm | |

OTHER PUBLICATIONS

Office Action for U.S. Appl. No. 17/304,476, dated Dec. 14, 2022, Damm, "Ad-Hoc Authenticated Group Discovery", 33 pages.

Office Action for U.S. Appl. No. 17/304,476, dated Aug. 29, 2022, Damm, "Ad-Hoc Authenticated Group Discovery", 24 pages.

Office Action for U.S. Appl. No. 17/304,476, dated May 12, 2023, Benjamin Damm, "Ad-Hoc Authenticated Group Discovery", 38 pages.

Canadian Office Action dated May 26, 2023 for Canadian patent application No. 3,156,109, a foreign counterpart of U.S. Appl. No. 17/304,471, 4 pages.

Canadian Office Action dated Jun. 5, 2023 for Canadian patent application No. 3,156,114, a foreign counterpart of U.S. Appl. No. 17/304,476, 5 pages.

\* cited by examiner

DATA SHARING IN A MESH NETWORK

RELATED APPLICATIONS

This patent application is related to U.S. patent application Ser. No. 17/304,476, titled "AD-HOC AUTHENTICATED GROUP DISCOVERY," filed on Jun. 22, 2021, commonly assigned herewith, and hereby incorporated by reference.

BACKGROUND

Analytical software running at a head office and applications running on smart meters and other devices within a smart grid provide increasingly sophisticated analyses of data to better manage electrical distribution. Aggregating data from smart meters allows utility companies to perform analyses that anticipate bottlenecks, avoid power failures, and generally optimize grid operation.

However, performing the sophisticated analyses and leveraging the information obtained from smart meters and other network nodes requires an accurate knowledge of network topology, including which meters are connected to each transformer. Unfortunately, utility and distribution companies may not have connectivity information or up-to-date connectivity information for individual meters. For example, a line worker may change connections under time pressure to alleviate local power problems without appropriately updating the connectivity information. Because transformers, meters and other infrastructure may stay in service for decades, errors within the connectivity information can accumulate. Without an accurate record of network topology, smart grid analytics, applications and other functionality may be degraded.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview of Techniques

The disclosure describes techniques for ad-hoc authenticated group discovery and data sharing in a mesh network. Using techniques described herein, a group of devices is created without leaving a security gap due to the open communication needed to establish the discovery of the devices forming the group. In some examples, devices (e.g., smart meter devices) that are identified as connected to a same transformer are identified to be part of the same group. In other configurations, a group may be specified to include other devices based on other matching criteria (e.g., devices connected to a same device, devices having a same group identifier, . . . ). The group can be authenticated autonomously following network discovery of the devices. Instead of requiring global pre-assigned keys for authentication, the devices in the group are authenticated with signatures and certificate passing thereby providing strong security.

The efficiency of data sharing between the devices of the network, such as a mesh network, can also be increased compared to traditional mesh broadcasting techniques. Using the techniques described herein, one or more devices may act as a bridge device between devices of a same group that are not in direct wireless communication with each other. As used herein "direct wireless communication" refers to a first device receiving wireless communications directly from a second device (without any intervening devices or relays). A device that is not in direct wireless communication may be referred to as being "wirelessly disconnected". As used herein, a "bridge device" is a device that acts as a proxy for one or more neighbor devices that are wirelessly disconnected from at least one other device of a group. For example, even though two devices (a first device and a second device) may be part of the same group, the first device may not consistently receive messages transmitted by the second device or vice versa (e.g., due to network congestion, noise, physical obstructions, etc.). After a device is identified (which can be in a same or different group from the two devices) to act as a bridge device for a device, the bridge device relays messages that are directed to the device and/or are received from the device. In this way, instead of devices that are not directly connected within the same group having to continually rebroadcast messages, routes through one or more bridge devices can be identified which reduces the number of messages sent by devices in the mesh network. By using techniques described herein, data sharing is more efficient as compared to prior techniques in which many more communications may be made to share data between different devices. For example, the reduced number of rebroadcasts results in an overall reduction in network traffic and congestion, and a reduction of power required to continually rebroadcast which extends battery life of battery powered devices.

Example System and Techniques

Figure 1:
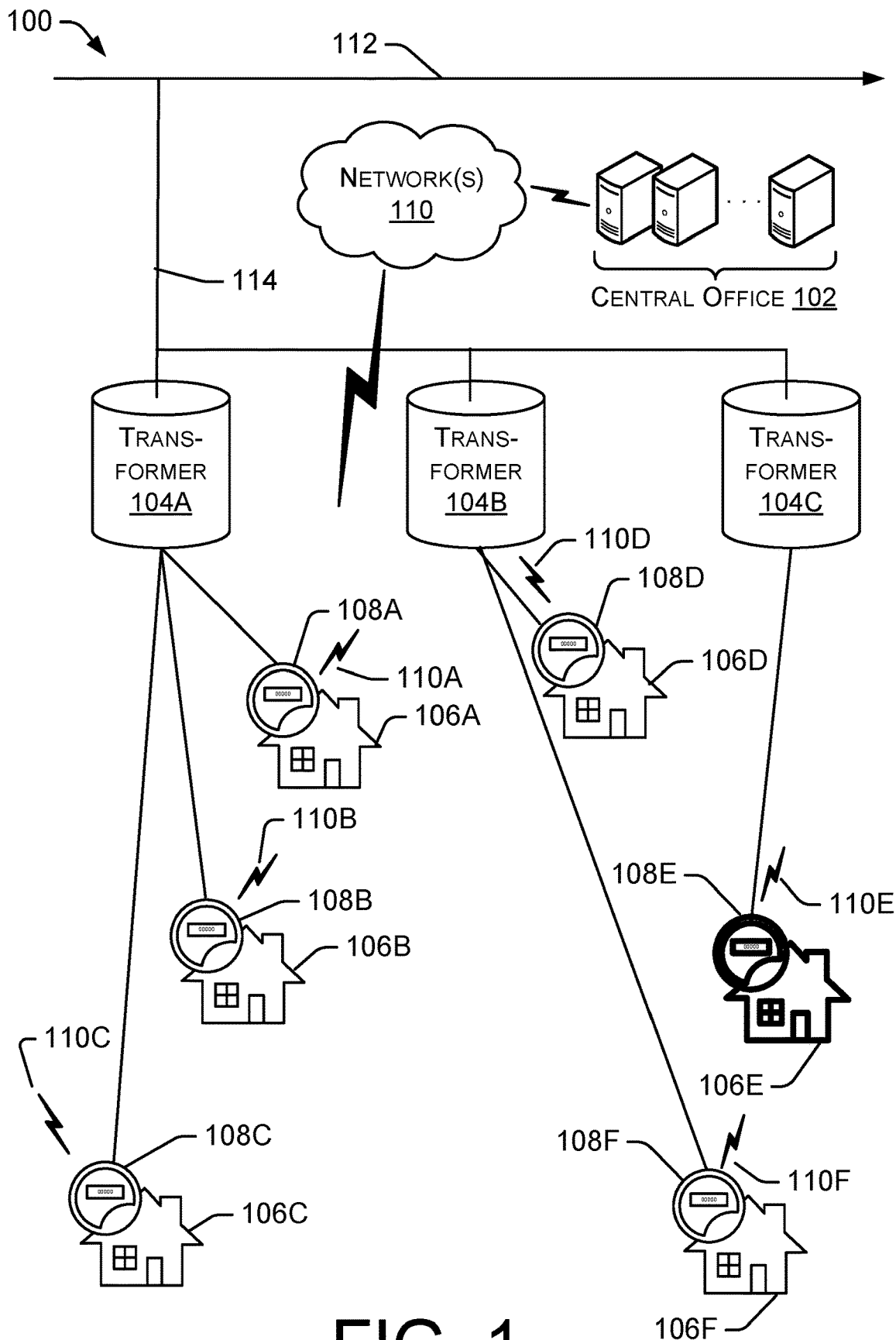
FIG. 1 is a block diagram of an example of a smart electrical grid that includes devices configured to perform ad-hoc group discovery and sharing of data in a mesh network.

FIG. 1 is a block diagram of an example of a portion of a smart electrical grid 100, that includes devices configured to perform ad-hoc group discovery and sharing of data in a mesh network. As illustrated, smart electrical grid 100 includes a central office 102 (sometimes called a back office, office, utility company headquarters, or similar).

In the example shown, a plurality of smart utility consumption metering devices 108, such as devices 108A-108F, or other network nodes/devices are in communication with a central office 102, such as by using radio frequency (RF) transmissions, power line communications (PLC), or other technology. While a mesh network may be used for the devices 108 to communicate with each other, portions of the communications may be performed by other networks 110, such as networks 110A-110F and/or the Internet.

Devices 108 may relay information within the mesh, which may include transmissions in one or both directions (upstream toward the central office 102 and/or downstream toward other devices). The central office 102 may be configured to include collection engine (CE) functionality. In some implementations, aspects of the CE functionality may be distributed, partly or fully, within some or all of the devices 108. The central office 102 and its functionality may be centralized within a utility company, distributed among locations within the smart electrical grid 100, and/or located in a data center location or "cloud" environment.

A primary feeder 112 is represented by an arrow directed away from a substation (not shown). The primary feeder 112 is connected to transformers 104, such as transformers 104A-104C by wiring 114. The transformers 104 provide power over low voltage lines to customers 106A-106F (illustrated in FIG. 1 as solid lines from the transformers 104A-104C to the customers 106A-106F). The power is metered by devices 108A-108F, which may each be referred to herein as a "meter".

The smart electrical grid 100 is configured to perform ad-hoc authenticated group discovery and data sharing that uses one or more devices 108 as a bridge device. As briefly discussed above, groups may be formed that include devices matching specified criteria. In the example illustrated in FIG. 1, groups include devices 108 that are identified as being connected to a same transformer.

Grid-side network discovery techniques may be used to determine network topology and electrical phases used by network components. Having a better understanding of grid topology improves the safety of the grid and avoids linemen from being electrocuted when working on a line that was erroneously thought to be disconnected. The techniques may utilize one or more reference device(s) 108 in phase angle determination (PAD) process(es) configured to reach most or all network devices 108. In the example of FIG. 1, one or more devices 108 may be used as a reference meter(s). The PAD processes may be configured to determine, for other network devices 108, a phase angle relative to the reference meter(s). Techniques to perform transformer phase discovery (TPD) may determine a phase to which each transformer is connected (e.g., which phase of three phase power each transformer is connected). At the end of the processes, an association of each meter to a transformer may be known.

The TPD processes may be performed utilizing several different techniques. In a first example, the TPD may be performed as secondary effect of PAD, whereby for each transformer 104 one device 108 receives the PAD signal before other meters associated with the transformer and re-transmits the signal by power line communication (PLC), thus enabling identification of other meters electrically connected to the transformer. In a second example, the TPD may be performed as PLC propagates data indicating unusual voltages as they occur. In a third example, the TPD may be performed as inter-meter communication by PLC at the beginning of each interrogation response. Aspects of smart grid topology may also include feeder (electrical conductor) topology discovery (FTD). In one example, FTD may employ beacon meters distributed throughout the grid.

According to some examples, the smart electrical grid 100 may use data matching to determine what devices are in the same group, such as on the same transformer 104. For instance, zero-crossings may be used to measure time within the smart electrical grid 100, and to determine the connectivity of, and the electrical phase used by, particular nodes, such as devices 108. A zero-crossing is indicated at a time when the line voltage of a conducting wire in an electrical grid is zero. As an example, a first device 108A (e.g., first meter) may receive a phase angle determination (PAD) message, including zero-crossing information, sent from a second device 108B (e.g., second meter), hereafter called a reference meter. The first meter may compare the received zero-crossing information to its own zero-crossing information. A phase difference may be determined between the first meter and the reference meter from which the PAD message originated. The first meter may pass the PAD message to additional devices 108 (e.g., meters), which propagate the message through the network. Accordingly, an electrical phase used by devices 108 within the network may be determined. To identify whether particular meters are connected to a transformer 104, a determination may be made as to whether a device 108 may communicate with the transformer using power line communications (PLC).

U.S. Pat. No. 10,459,016 issued Oct. 29, 2019 (hereinafter Driscoll), which is incorporated by reference in its entirety, includes further details that may be used to determine the network topology, in some examples. Other techniques, however, may be used to determine the network topology. Generally, the network topology for groups may be determined by data matching techniques, such as a comparison of data sets from two independent devices that can result in some correlation. A positive match between two devices assists in determining that the devices are part of the same group and that a route may be established between the devices.

While examples described herein refer to "electrical data", the data may be any type of data. All devices continue to send data via periodic broadcast to all devices in RF range to provide them with electrical data that establishes a comparable electrical signature. Devices receiving data from other devices will hold onto this data and "process" it for its electrical signatures. Processing includes comparison to other devices in the same network over time to establish a repeating signature with high confidence.

The network topology may change over time. For example, devices 108 that are connected to a transformer 104 may be added or removed. As such, the central office 102 and/or some other device or component may repeat the network topology process to determine the current groups. When a change in the network is detected the groups indicating the groups and the connected devices may be updated.

In FIG. 1, after performing group discovery, the central office 102, one or more devices 108 (e.g., meters), and/or some other device or component may determine groups to which the devices belong. For example, devices 108A, 108B, and 108C are determined to be members of a first group associated with transformer 104A, devices 108D, and 108F are determined to be members of a second group associated with transformer 104B, and device 108E is determined to be a member of a third group associated with transformer 104C.

After identifying the groups for the devices 108, the groups can be created and authenticated without leaving a security gap due to the open communication needed to establish the discovery of the devices forming the group. Each group can be authenticated autonomously following discovery of the devices that are to form the group. Instead of requiring global pre-assigned keys for authentication, the devices 108 in the group are authenticated with signatures and certificate passing thereby providing strong security. In some configurations, asymmetric authentication can be used to authenticate devices. Generally, asymmetric authentication or public-key cryptography is a cryptographic system that uses public keys that may be known to others, and private keys that are unknown by others. Using asymmetric authentication, a transmitting device can combine a message with a private key to create a short digital signature on the message. Anyone with the public key of the transmitting devices can combine that message with a claimed digital signature, and if the signature matches the message, the origin of the message is authenticated. See FIGS. 6-7 for more details regarding certificate requests/responses.

In some configurations, the data sharing between the devices 108 of the smart electrical grid 100, or some other mesh network, can also be more efficiently shared compared to prior techniques. Using the techniques described herein, one or more devices 108 may act as a bridge device between devices of a same group that are not in direct wireless communication with each other.

As an example, device 108E of FIG. 1 has been identified as a possible bridge device, as indicated by the bolding, that can be used to relay communications between device 108D and device 108F. After the bridge device 108E is identified (explained in more detail below), which in this example is in a different group from the devices 108D and 108F, one or more of the devices 108D and 108F may request/confirm that the device 108E is to act as a bridge.

After the device 108E is confirmed as the bridge device for devices 108D and/or 108F, when device 108E receives a message from device 108D, the device 108E forwards the message to device 108F. Similarly, when device 108E receives a message from device 108F, the device 108E forwards the message to device 108D. In this way, instead of devices 108D and 108F having to continually rebroadcast messages as in prior techniques, a route through bridge device 108E is identified that reduces the number of messages sent by the devices 108D and 108F.

Figure 2:
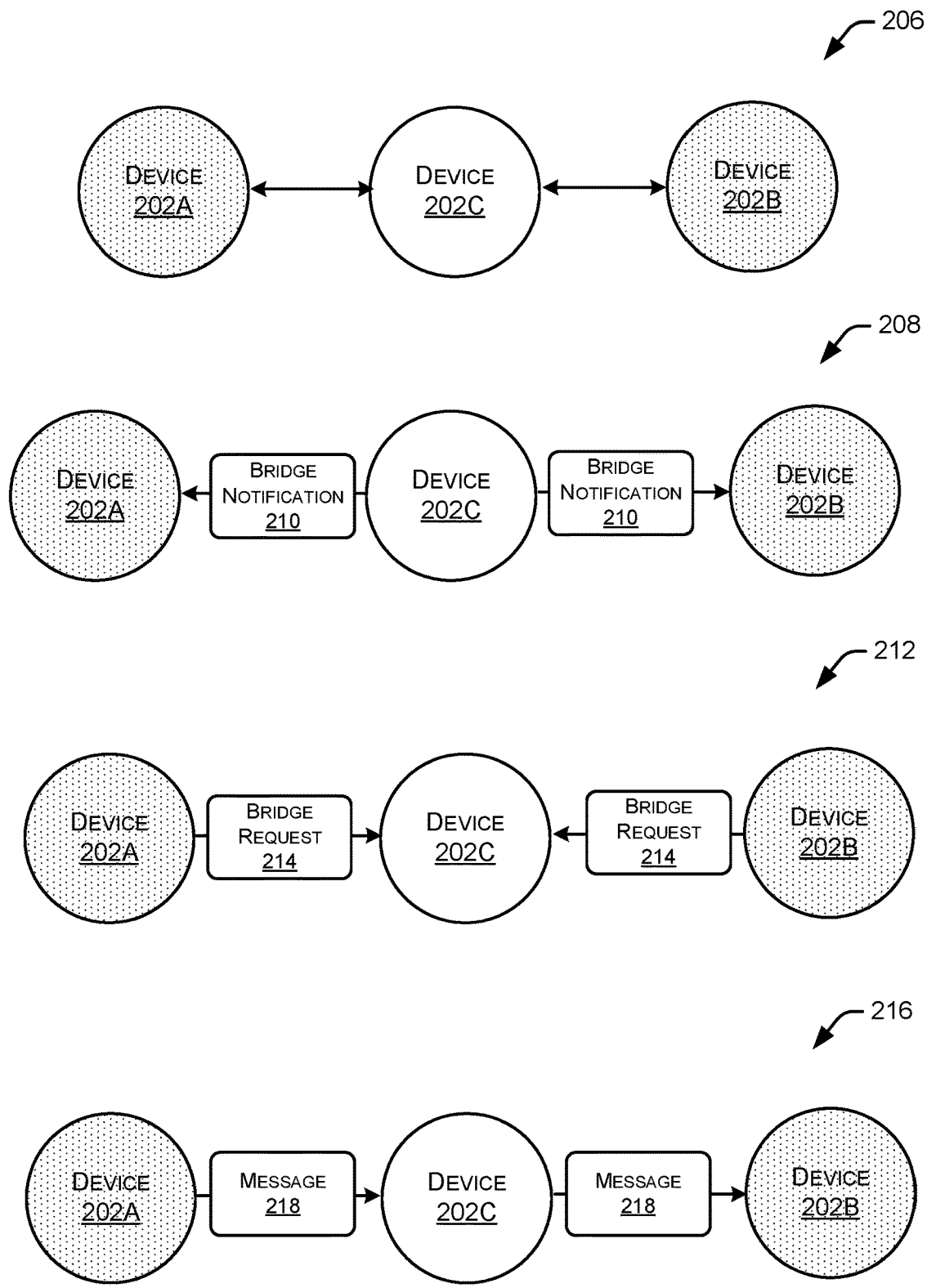
FIG. 2 is a block diagram that illustrates using a device as a bridge device between two devices.

FIG. 2 is a block diagram that illustrates using a device 202C as a bridge device between two devices 202A, and 202B. Prior to techniques described herein, each device within a mesh network receiving a broadcast repeats the broadcast. This results in many transmissions. The amount of bandwidth that this consumes can be more than the bandwidth that is available within the mesh network. By identifying bridge devices, the number of repeated broadcasts may be reduced significantly (e.g., to a single broadcast) to devices in range and then one or more messages may be delivered to devices (e.g., within 2 hops) that are identified as being part of the same transformer group.

Mesh-networks provide benefits over some other types of networks. For example, unlike traditional star networks, mesh networks provide better network coverage, do not have a single point of failure, are self-configuring, and adapt to changes in the nodes making up the mesh-network. Mesh-networks, however, can use more bandwidth than traditional star networks. A star network is one where devices connect directly to an internet access point (IAP), such as a cell tower, or other router connected to a high-bandwidth internet connection. A mesh network is a network where some devices may connect directly to an IAP in some instances, and at other times RF traffic passes through other devices forming a chain of devices responsible for delivering transmissions to/from the IAP where direct connection is not possible.

Mesh-networks are also generally less efficient compared to some other types of networks due to the multiple hops it may take a message to travel from a transmitting device to a receiving device. The term "hop" refers to each time the message is received. For every "hop" through another device, an additional series of transmissions occurs. The more "hops" traffic must take through other devices causes a large increase in the use of bandwidth. If two hops are taken to reach a destination, at least two transmissions plus any overhead for communications such as request to send (RTS), clear to send (CTS), acknowledgment (ACK), may be used.

As an example, if device A transmits from A to B, then through C, D, and E and finally to an Internet Access Point (IAP), this constitutes five hops, and five series of transmissions to deliver a single data packet to the IAP from device A. This uses five times more bandwidth throughout the entire mesh network as compared to a star network. In many cases, because of the distance between the devices along a path in a mesh network, devices on one end of the route may not be able to communicate directly with device(s) on the other end of the route.

The number of hops depend on the size of the network. By using bridge devices as described herein, data sharing is more efficient as compared to prior techniques in which many more communications may be made to share data between different devices. For example, other techniques to share data include, but are not limited to unicast and broadcast. In unicast each device sends a unicast message to each of the other devices. As such, if there are N devices to share with, for any single device N unicast messages are sent. If N is 100, then not only does a device send 100 unicast messages, each of the other 100 devices also sends 100 messages, meaning that a single device hears 10,000 unicasts in any single period of time this is being sent in addition to having to send its 100. This is a large amount of bandwidth being used.

In broadcast, a device sends a single broadcast message to the N devices. Using the same example as in the unicast example, when sharing with N devices, the device sends one broadcast transmission, and each of the N devices also sends one transmission, thus 100 broadcast messages may be received by each device. This is significantly more efficient as compared to the unicast method. A broadcast message is not acknowledged by the receiving device, but the broadcast message may be forwarded on receipt. Because a broadcast message is not acknowledged by the receiving device, it is often sent multiple times to help raise the probability of receipt. This forwarding may be repeated a number of times by receiving devices, thereby increasing the bandwidth usage. Broadcasts are also "targeted" only in the sense that even though everyone receives it, it is not necessarily consumed by all devices if they are not interested in the data, but the devices still must receive it to inspect it.

Using techniques described herein, the number of broadcasts and/or unicasts may be reduced using the bridge devices. For example, instead of continually rebroadcasting messages, a single broadcast/unicast may be made to a bridge device to relay the message to another device.

As discussed above, a device may be identified within the mesh network to act as a bridge device between two other devices. Referring to FIG. 2, device 202A and device 202B are associated with a first group, and in this example, device 202C is associated with a second group. In other examples, device 202C may be a member of the same group that includes device 202A and device 202B. In the current example, device 202A and 202B are not in direct wireless communication with each other (e.g., due to distance, interference, and/or some other condition), but both device 202A and 202B can communicate wirelessly with device 202C. As such, device 202C may act as a bridge device that connects the devices 202A and 202B that are not in direct wireless communication.

According to some configurations, each device 202 may identify itself in messages with a "group identifier" that indicates a group association for the device 202. In this way, a device, such as device 202C that receives messages from a different device can determine what group the different device is a member of (e.g., as indicated by the group identifier). For example, the device 202C may determine if the other device is in the same group as device 202C, is in a different group, or is not part of a group.

As an example, as illustrated by indicator 206, device 202C may receive a message transmitted wirelessly from both device 202A and device 202B along with a group identifier, such as "first group". The device 202C may also determine that a message received from another device is intended for a device or devices in the first group. In this case, device 202C may identify itself as a possible bridge device between device 202A and 202B. In some configurations, the device 202C identifies itself as a possible bridge device to neighbors that are in direct wireless communication with device 202C.

The device 202C may transmit a simple unicast message (or some other type of message) informing both other devices 202A and 202B that they are likely in the same group, and thus offering to act as a bridge device. In some examples, the device 202C transmits a bridge notification message 210 as illustrated by indicator 208. The bridge notification message may include information that identifies that device 202C may act as a bridge between device 202A and 202B and information such as authentication information, network information, and the like.

If the two devices 202A and 202B decide they want device 202C to act as a bridge device, a reply is sent back to device 202C confirming that device 202C should act as a bridge device. According to some examples, one or both of devices 202A and 202B may request the device 202C to act as a bridge in response to the bridge notification 210. In some cases, more than one device (not shown) may identify itself as a possible bridge device between the two devices 202A and 202B.

According to some configurations, as illustrated by indicator 212, one or both of the devices 202A and 202B may reply with a bridge request message 214 that requests device 202C to act as a bridge between device 202A and 202B. From this point forward, any broadcasts that are received from a device 202A, 202B that sent the bridge request message 214 can be forwarded (e.g., as a unicast message to the other device that has accepted the bridge request). This substantially removes the need for repeating broadcasts.

Once device 202C is acting as a bridge device, when device 202C receives a message from one of the devices 202A or 202B, it can forward the message to the other device. As illustrated by indicator 216, bridge device 202C has received a message 218 from device 202A and then forwards the message 218 to device 202B. By using bridge devices, devices 202 within a mesh network do not need to rebroadcast in other techniques. For instance, in the current example, only the device 202C receives the message from device 202A which is then forwarded to device 202B with a single wireless transmission.

Figure 3:
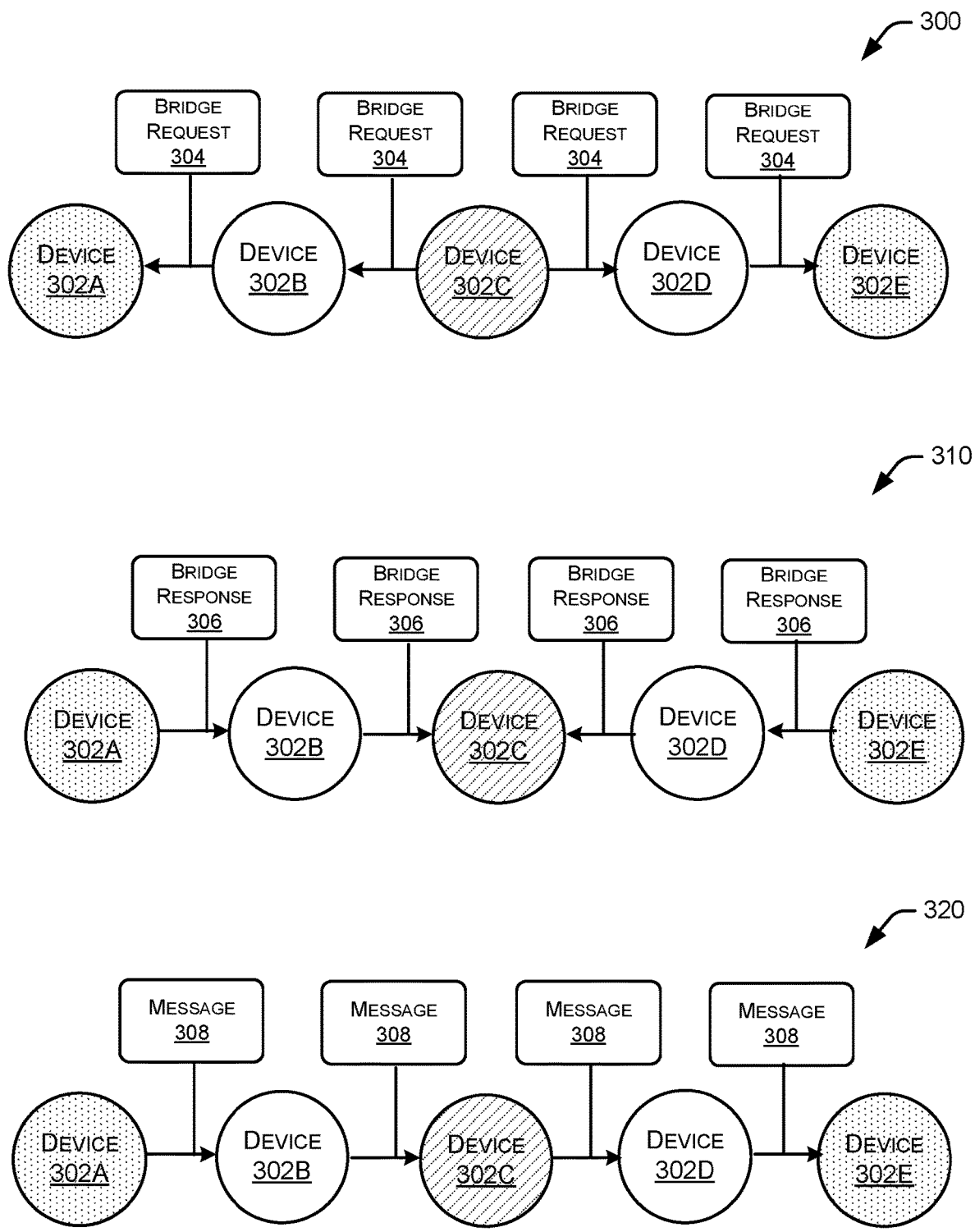
FIG. 3 illustrates message forwarding between multiple devices.

FIG. 3 illustrates message forwarding between multiple devices. As discussed above, communications in a mesh network may be very inefficient and use a large amount of bandwidth. Using the techniques described herein, routes may be established to reduce the re-broadcast of the same message.

A 5-hop example is illustrated by 300, 310, and 320. According to some configurations, prior to identifying routes between different devices, the devices 302 may communicate for a period using traditional mesh re-broadcasting techniques. The period being long enough to determine data correlations and routes between the devices, then reduce the frequency of the broadcast forwards. For example, initially broadcasts may be sent by devices 302 every five minutes, but then after initial correlations are made, every eight hours. In some examples, broadcasts are periodically performed to allow new devices 302 to be discovered and correlations made. After determining the connections between devices, one or more devices 302 may act as a bridge device between other devices. The central office 102, and/or some other device or component, may generate routes between the different devices based on the connections identified between the different devices 302, as discussed in more detail above with reference to FIG. 1 and FIG. 2.

In some configurations, a device 302 receives broadcasts from two hops away. In the example of FIG. 3, device 302C receives broadcasts from devices 302A, 302B, 302D, and 302E that are one or two hops away. To establish a route between the devices that is more efficient as compared to re-broadcasting all the messages, the device 302C sends a bridge request message 304 to the devices 302B and 302D that are then forwarded to devices 302A and 302E as illustrated by indicator 300.

As discussed above, one or more of the devices 302A, 302B, 302D, and 302E may respond to the bridge request message 304 with a bridge response message. In the current example, devices 302A and 302E have accepted the bridge request by sending the bridge response message 306 that is received by devices 302B and 302D that forward the bridge response message 306 to device 302C. In response to receiving the bridge response message 306, the device 302C now acts as a bridge device. After establishing the device 302C as a bridge device, the broadcasts are only forwarded one time by devices 302A-302E as illustrated by 320 where message 308 is forwarded from device 302A to 302E.

Figure 4:
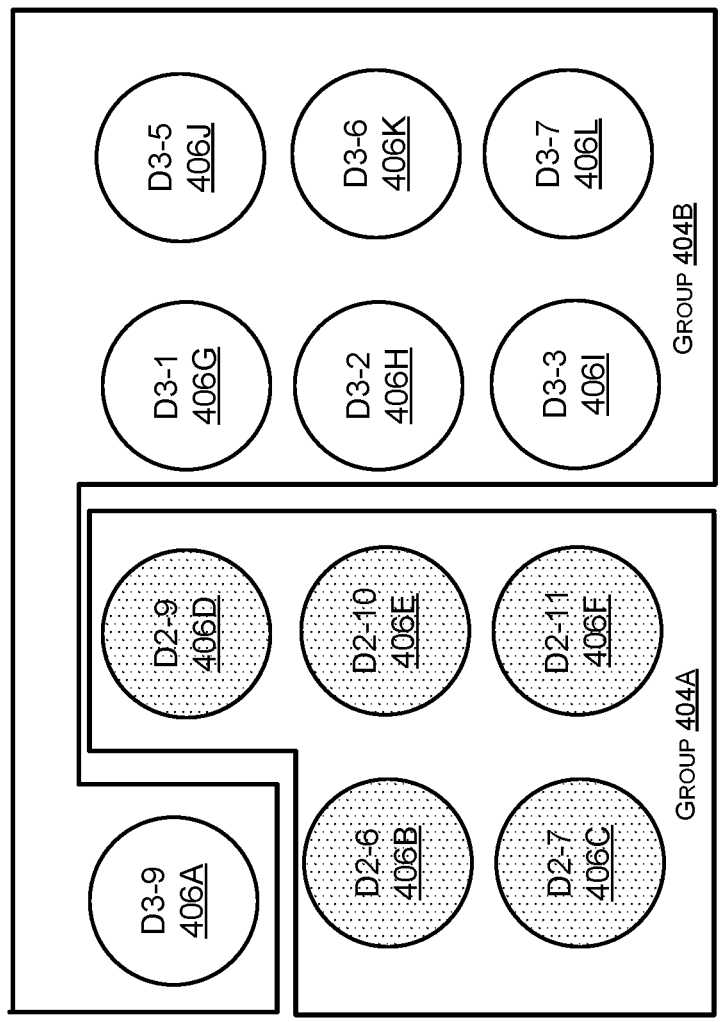
FIG. 4 is an example system for authenticated transformer group discovery.

FIG. 4 is an example system 400 for authenticated transformer group discovery.

As illustrated, FIG. 4 shows two different groups 404A and 404B. Group 404A includes devices 406B-406F, and group 404B includes devices 406A and 406G-406L. Device 406A is separated from the other devices 406 that are within group 404B.

Figure 5:
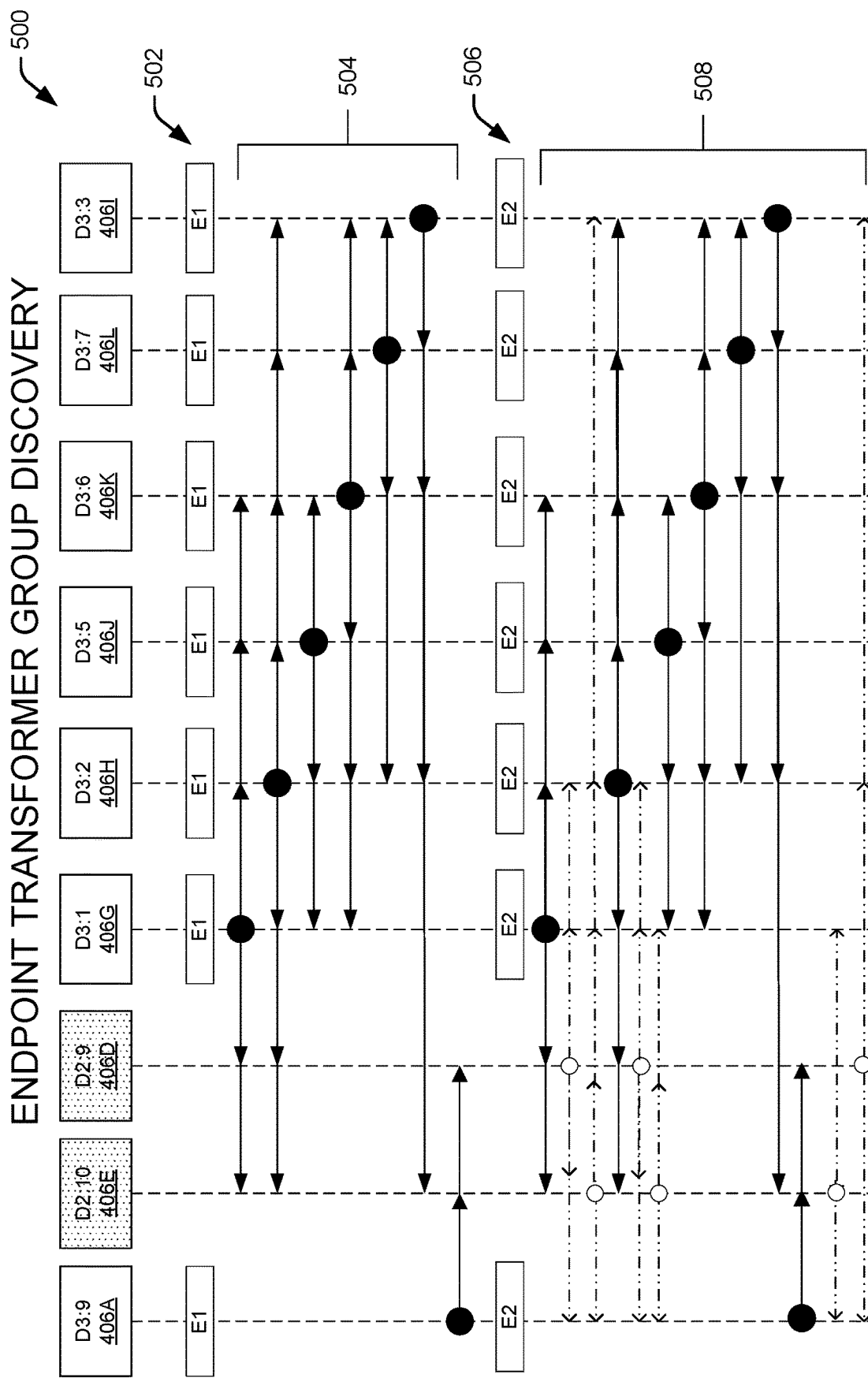
FIG. 5 shows a message flow for device discovery.
Figure 6:
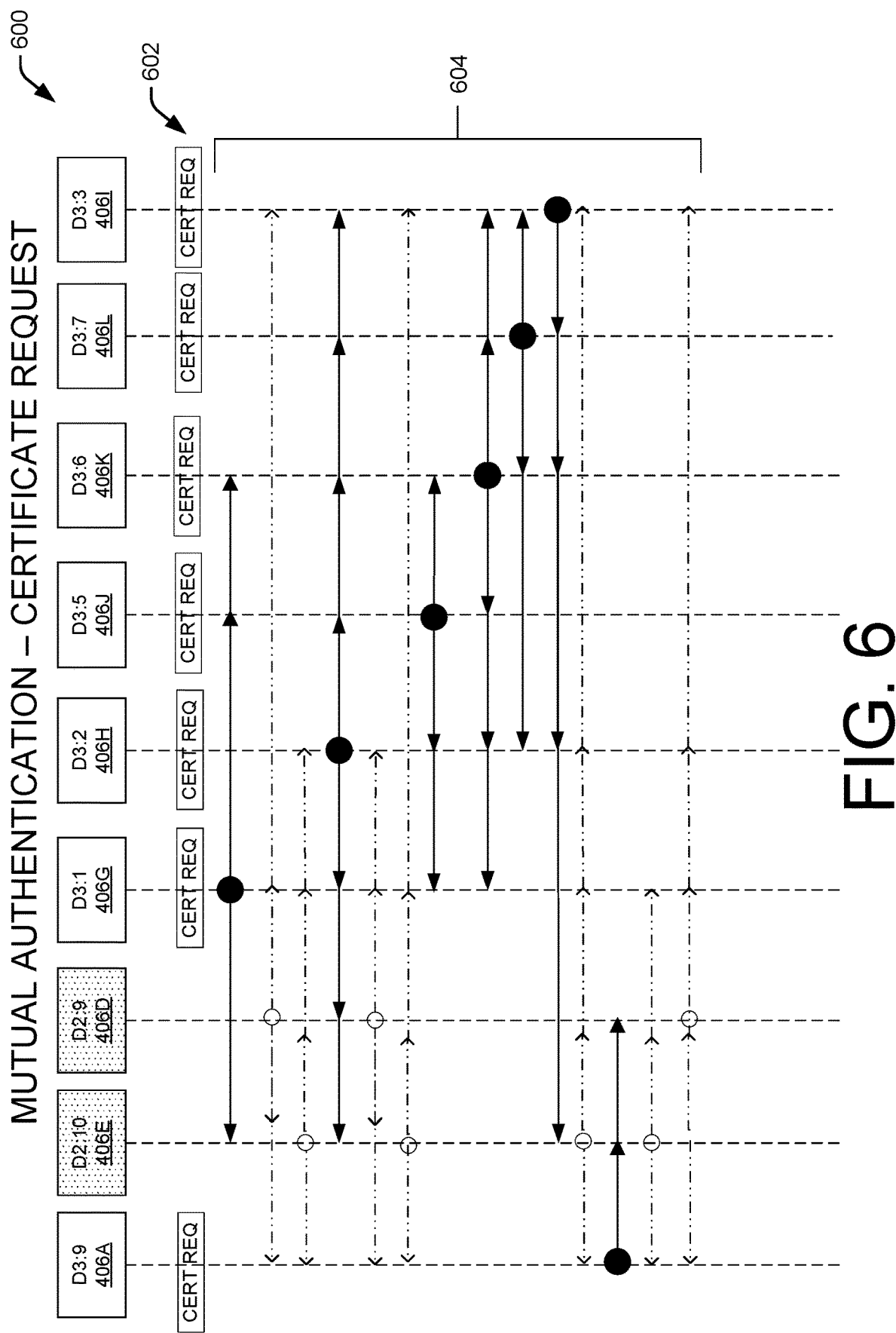
FIG. 6. shows a message flow for a mutual authentication certificate request.
Figure 7:
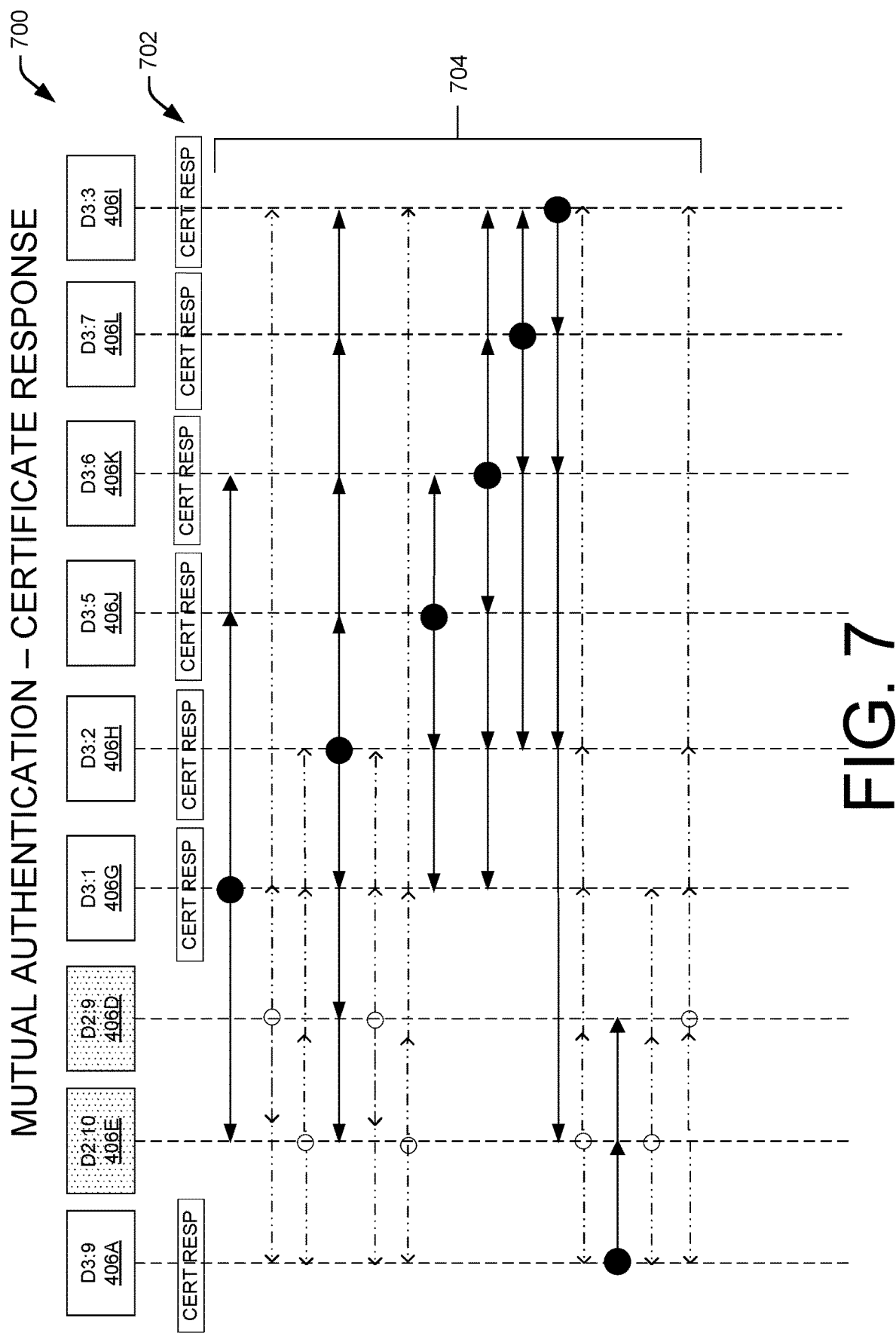
FIG. 7 shows a message flow for a response to the mutual authentication certificate request.

Using the techniques described herein, the discovery of the devices may occur autonomously without direction from a central component, such as the central office 102. Strong security may be obtained without requiring global pre-assigned keys for authentication. FIGS. 5-7 illustrate message flows for device discovery, certificate requests, and certificate responses using the example devices and groups as illustrated in FIG. 4.

FIG. 5 shows a message flow 500 for device discovery. As illustrated, the connections between the devices are for the devices 406 as illustrated in FIG. 4. As discussed above, devices may be discovered and associated with a group. For instance, the devices 406 may be associated with a group based on to what transformer the device 406 is attached. In the example of FIG. 5, devices 406A, and 406G-406L are associated with group 404B, and devices 406E and 406D are associated with group 404A.

As briefly discussed above, devices may periodically share an event. Initially, at 502, a discovery event (E1) for group 404B is broadcast. Each device 406 that detects the discovery event (E1) shares the event E1 with the neighbors of the device. As can be seen in message flow 504, each device 406 that is part of the group 404A has received the event E1 (as indicated by the black circle) and message flow. The devices 406 in other groups do not detect the event. During the message flow sharing the event, devices 406E and 406D have received messages that are directed to other group members of group 404A. According to some configurations, if a device receives a message that does not match its own detected event data (e.g., an event for group 404B), the device 406 checks if the message is a match with other received unmatching event data from other neighbors. If there is a match, the device recognized that it may act as a bridge device between the devices sharing matching event data. As illustrated, device 406E and/or device 406D are configured to act as a bridge device for devices 406A, 406B, and 406C.

At a second time 506, a second discovery event (E2) for group 404B is broadcast. Each device 406 that detects the discovery event (E2) shares the event E2 with the neighbors of the device. As can be seen in message flow 508, each device 406 that is part of the group 404A has received the event (as indicated by the black circle) and message flow. The devices 406 in other groups do not detect the event. In this second event, the devices 406E and 406D act as a proxy to forward messages to/from device 406A as indicated by the dashed message flows.

FIG. 6 shows a diagram 600 that illustrates a message flow 604 for a mutual authentication certificate request. As discussed above, certificates and/or keys do not need to be requested/exchanged before the devices 406 are associated with a group.

In some configurations, each device that is identified as part of a group may request certificates, as illustrated by indicator 602, from the other devices 406 that are identified to be part of the group. In the current example, each of the devices 406A, and 406G-406L that are identified to be in the same group, send certificate requests with the other group members. As in FIG. 5, devices 406E and 406D act as a proxy to send data back and forth as indicated by the dashed line message flows.

FIG. 7 shows a diagram 700 that illustrates a message flow 704 for a response to the mutual authentication certificate request. As discussed above, certificates and/or keys do not need to be requested/exchanged before the devices 406 are associated with a group.

In some configurations, each device 406 that is identified as a member of a group may request certificates from the other devices 406 that are identified to be part of the group. In the current example, after receiving the certificate request, each of the devices 406A, and 406G-406L send certificate responses, as illustrated by indicator 702, to the other group members. As in FIG. 5, and FIG. 6, devices 406E and 406D act as a proxy to send data back and forth as indicated by the dashed line message flows. In some configurations, certificate requests may also be made to other devices with which a device would like to share data. For example, devices 406E and 406D may be authenticated using these messages to confirm that they are safe to exchange data with.

Figure 8:
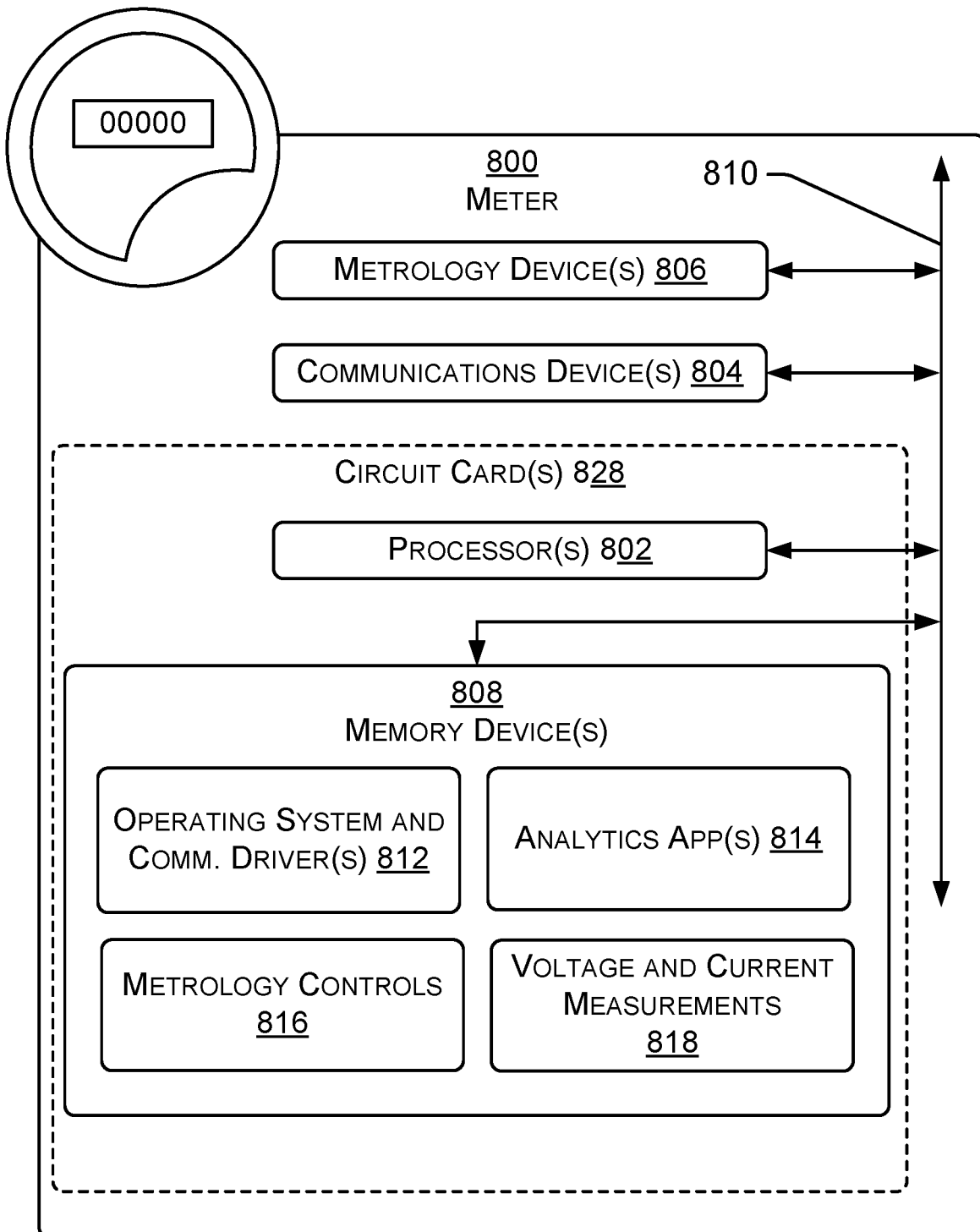
FIG. 8 is an example smart meter, configured to assist in ad-hoc authenticated group discovery and data sharing in a mesh network.

FIG. 8 is an example smart meter 800, configured to assist in ad-hoc authenticated group discovery and data sharing in a mesh network. In the example shown, processor(s) 802, communications device(s) 804, metrology device(s) 806, and memory device(s) 808 are configured to allow communication, such as over bus, PCB board or wiring harness 810.

The meter 800 may include one or more processors 802, such as microprocessors, microcontrollers, gate arrays, etc., that are configured to execute program statements or other logical instructions. The processor(s) 802 may be in communication with one or more communications device(s) 804, such as a radio frequency (RF) or power-line communication (PLC) transceiver. The communication device(s) 804 may provide one- or two-way communications with other meters or smart grid nodes, to thereby form a mesh or star network, and may provide communications directly or indirectly with the central office 102.

One or more metrology device(s) 806 may be configured to make voltage and current measurements. In some examples, such measurements may be utilized to determine power consumption at a customer. Accordingly, the metrology device(s) 806 may obtain paired voltage and current at rapid intervals or in a generally continuous manner, for use in calculation of power consumed at a customer's site. The paired measurements may be associated with a time of measurement (e.g., a timestamp), and may be saved in the memory device 808 and/or transmitted to the head office.

One or more memory devices 808 may be configured according to any technology, such as random access, flash, disk, etc. An operating system and one or more smart grid communications driver(s) 812 may be defined on the memory device 808. Communications driver(s) may be configured to operate communications devices 804, and to communicate with other meters and/or with the central office 102.

One or more analytics applications 814 may perform a number of smart grid analytic techniques, some of which are described with references made to FIGS. 1-7. Metrology controls 816 may include drivers or other software configured to operate the metrology devices 806. The metrology controls 816 may be configured to cause the metrology devices 806 to perform voltage and current measurements. Such measurements may be time-stamped or otherwise provided with an indication of a time of measurement. In some examples, voltage and current measurements 818 may be included in the input used by one or more analytics application(s) 814. The analytics applications 814 may be configured to perform operations relating to ad-hoc authenticated group discovery and data sharing in a mesh network.

In some examples, a circuit card 828 may be installed in a conventional or "dumb" meter, thereby providing an upgrade path for the meter to allow the meter to participate in a smart grid and/or as part of an advanced metering infrastructure (AMI). In various examples, the circuit card 828 may be configured to include one or more of the processor 802, communications devices 804, metrology devices 806, memory devices 808 and/or other devices. The devices included in the circuit card 828 may be determined by the design requirements of a specific installation.

Figure 9:
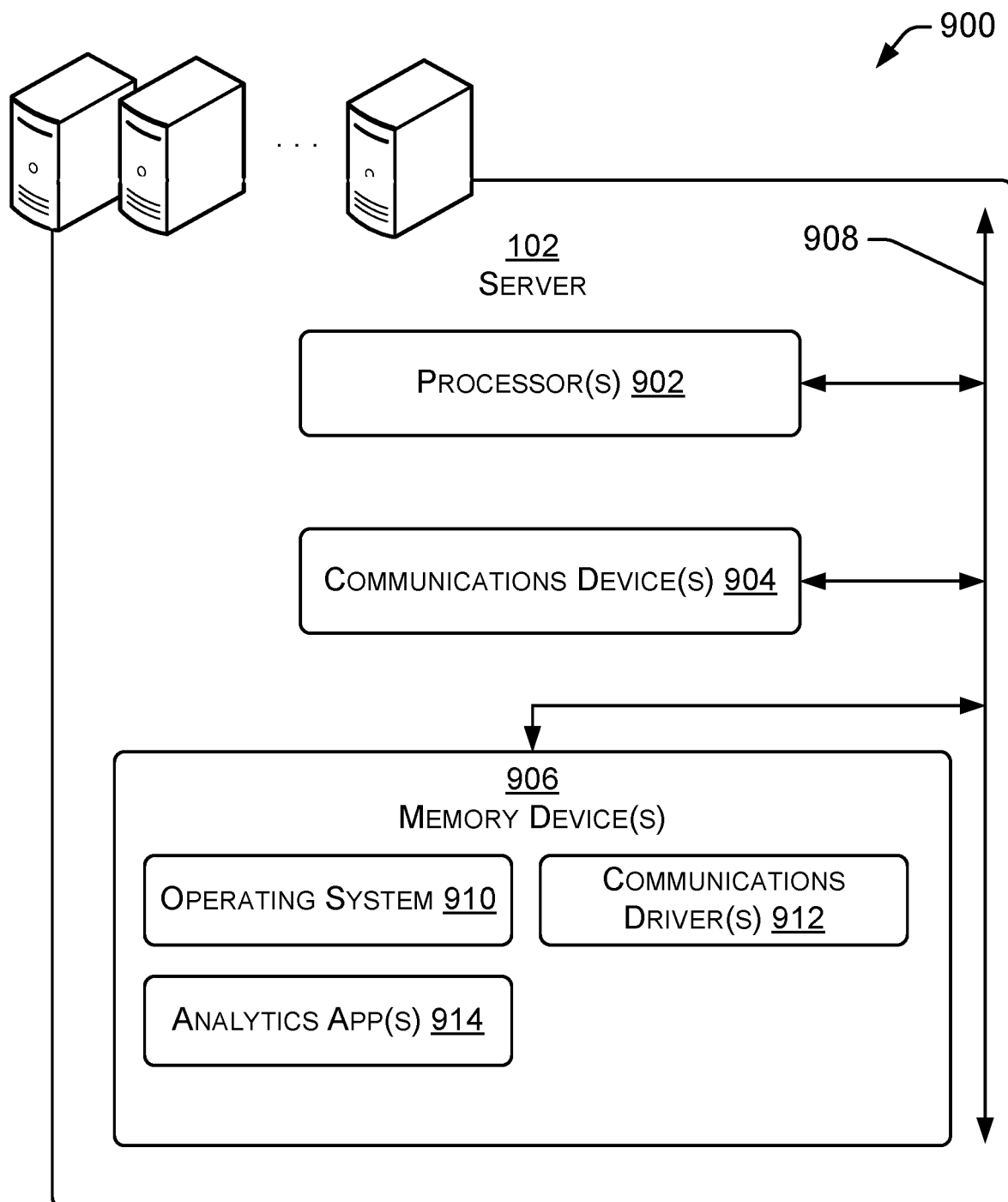
FIG. 9 is a block diagram showing example detail of a central or back office server, configured to perform operations relating to ad-hoc authenticated group discovery and data sharing in a mesh network.

FIG. 9 is a block diagram showing example system 900 of a central office 102 or back office server or other computing device, configured to perform operations relating to ad-hoc authenticated group discovery and data sharing in a mesh network. In the example shown, processor(s) 902, communications device(s) 904, and memory device(s) 906 are configured to allow communication, such as over bus, connector, or PCB board 908.

The computing device of the central office 102 may include one or more processors 902, such as microprocessors, microcontrollers, gate arrays, etc., that are configured to execute program statements or other logical instructions. The processor(s) 902 may be in communication with one or more communications device(s) 904, such as an RF or PLC transceiver. The communication device(s) 904 may provide one-way or two-way communications with meters or other smart grid nodes, to thereby form a mesh or star network.

An operating system 910, communications driver(s) 912, and one or more analytics applications 914 may be defined in the one or more memory devices 906. The analytics applications 914 may be configured to perform operations relating to ad-hoc authenticated group discovery and data sharing in a mesh network as described herein.

Example Methods

In some examples of the techniques discussed herein, the methods of operation may be performed by one or more application specific integrated circuits (ASIC) or may be performed by a general-purpose processor utilizing software defined in computer-readable media. In the examples and techniques discussed herein, the memory devices 808, 906 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

Figure 10:
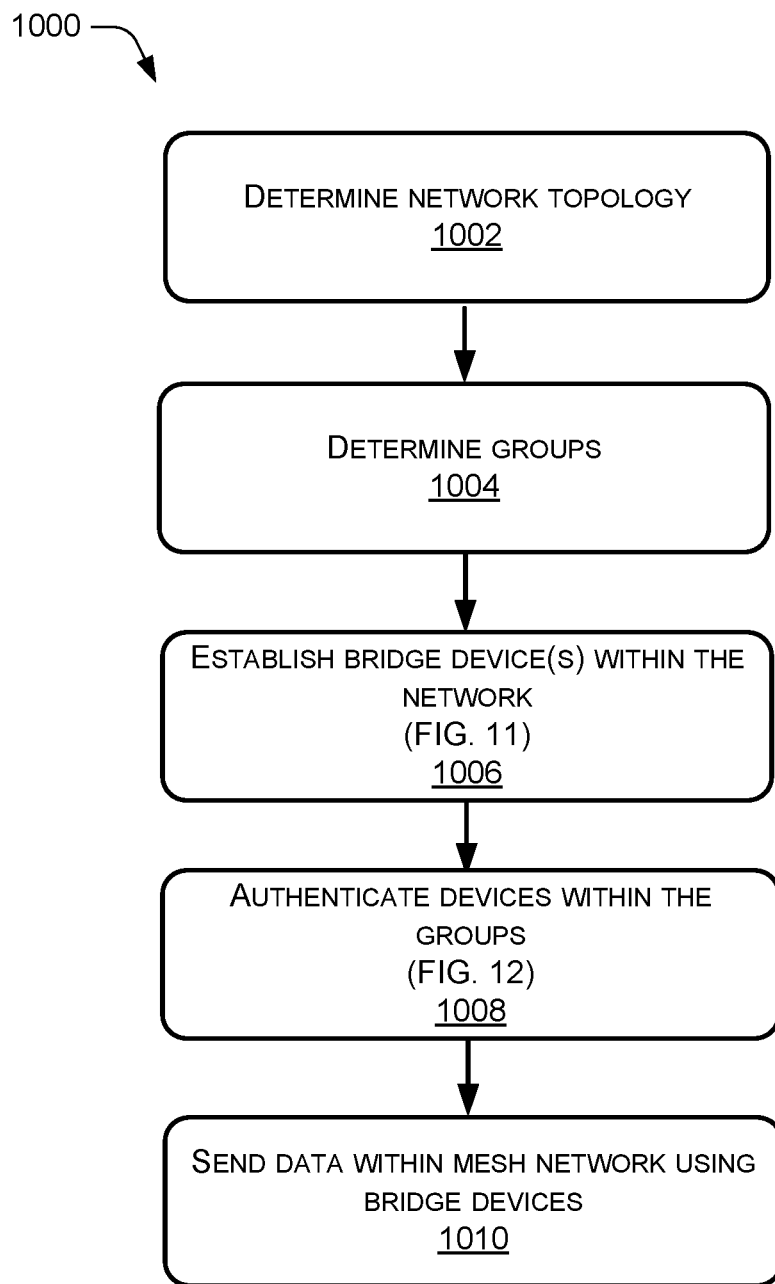
FIG. 10 is a flowchart showing a process for ad-hoc authenticated group discovery and data sharing in a mesh network.
Figure 11:
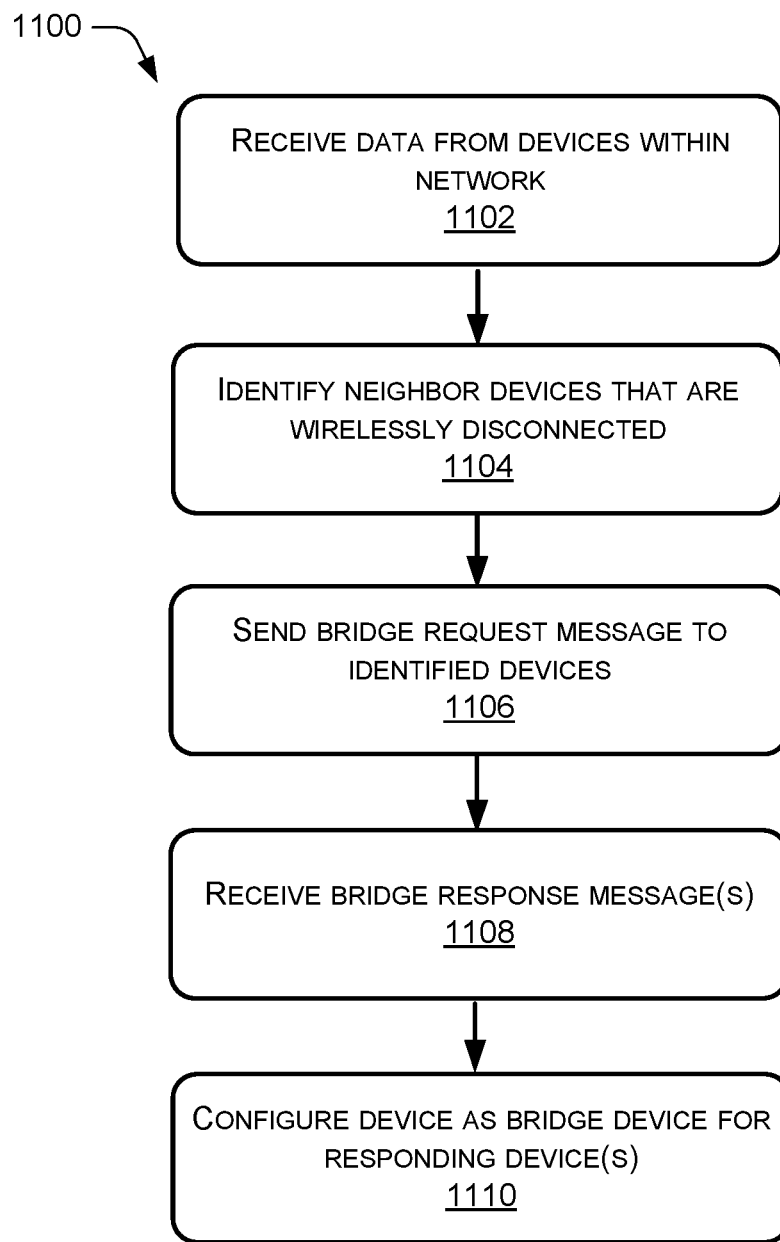
FIG. 11 is a flowchart showing a process for establishing bridge device(s) within the network.
Figure 12:
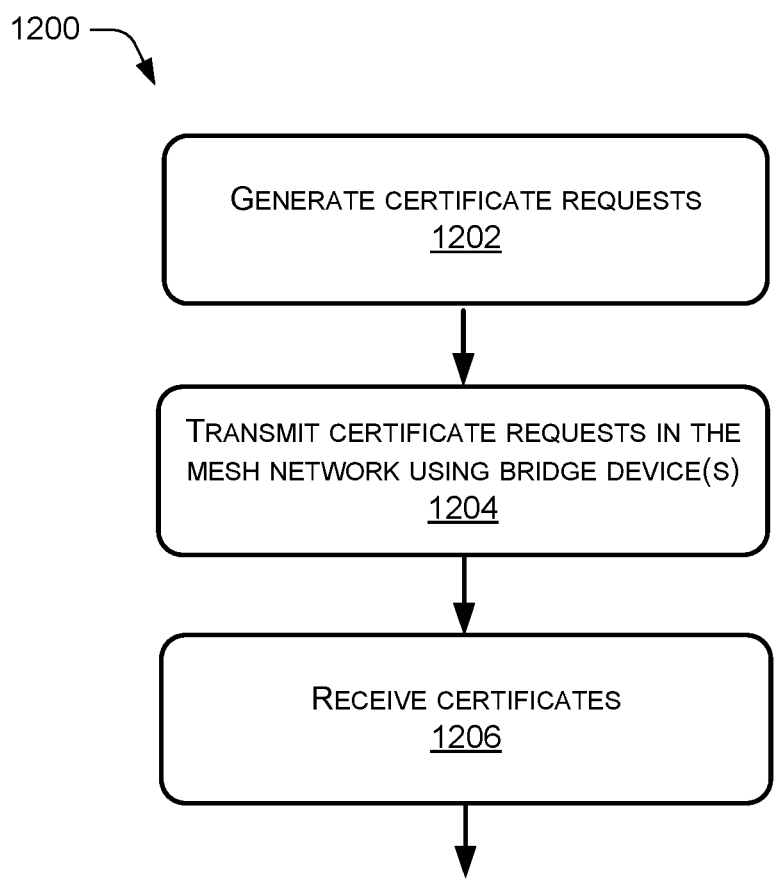
FIG. 12 is a flowchart showing a process for authenticating devices within groups in a mesh network.

FIGS. 10-12 are flow diagrams showing example processes which are representative of techniques for use in ad-hoc authenticated group discovery and data sharing in a mesh network. The processes are described with references to the examples and techniques of the figures described herein. However, the processes may be implemented by operation of numerous other meters, servers, and systems. Additionally, the meters, servers, and systems may be utilized to perform other operation of methods not specifically discussed herein.

FIG. 10 is a flowchart showing a process 1000 for ad-hoc authenticated group discovery and data sharing in a mesh network. At 1002, the network topology may be determined. As discussed above, the devices in the network may be determined based on a network discovery process. In some examples, grid-side network discovery techniques may be used by the central office 102, and/or other devices or components to determine network topology and electrical phases used by network components. Generally, any technique used to identify devices 108 within a network, such as a mesh network may be used. In some examples, network discovery techniques are repeated at different times to determine if a change has been made to the network.

At 1004, groups are determined for the devices. As discussed above, a data matching technique may be used by the central office 102, the devices 108, and/or some other device or component to determine what devices 108 are in the same group, such as what devices 108 are connected to the same transformer 104. For instance, zero-crossings may be used to measure time within the smart grid 100, and to determine the connectivity of, and the electrical phase used by the devices 108. In some examples, network discovery techniques are repeated at different times to determine if a change has been made to the network.

At 1006, bridge device(s) within the network are established. As discussed above, the data sharing between the devices 108, 202, 302, 406 of the smart electrical grid 100, or some other mesh network, can be increased using bridge device(s). For example, one or more devices 108, 202, 302, 406 may act as a bridge device between devices of a same group that are not in direct wireless communication with each other. See FIG. 11 and related discussion for more details.

At 1008, the devices within the groups are authenticated. As discussed above, each group can be authenticated autonomously following discovery of the devices that are to form the group. Instead of requiring global pre-assigned keys for authentication that would occur before group formation, the devices 108, 202, 302, 406 in the group may be authenticated with signatures and certificate passing thereby providing strong security. See FIG. 12 and related discussion for more details.

At 1010, data within the network are sent using the bridge device(s). As discussed above, bridge device(s) may be used to reduce the repeated broadcasts as used in prior techniques. For example, instead of requiring multiple re-broadcasts for a message, a message between two devices that are a neighbor to the bridge device may be performed using a transmission from the first device to the bridge device and a transmission from the bridge device to the second device.

FIG. 11 is a flowchart showing a process 1100 for establishing bridge device(s) within the network. As discussed above, a bridge device is a device 108, 202, 302, 406 that has been requested to act as a proxy and relay data/messages to other devices within a network, such as a mesh network.

At 1102, data is received from devices within a network. As discussed above, a device 108 within a mesh network may receive messages from different devices within a mesh network. Initially, and/or periodically, devices within the mesh network may be configured to use the traditional re-broadcasting techniques to identify any changes to the network topology (e.g., every 8 hours, every day, . . . ).

At 1104, neighbor devices are identified that may not be in direct wireless communication with each other. As discussed above, a device may determine that a message received from one or more devices is intended for a first group, and that a neighbor node is part of the first group. In some cases, devices of a same group may not be in direct wireless communication with each other due to different factors, such as but not limited to distance between the devices, interference, and the like.

At 1106, a bridge request message is sent to the identified devices. As discussed above, a device that may act as a bridge device for one or more other device(s) may identify itself as a possible bridge device. In some examples, the device 108 transmits a bridge notification message 210. The bridge notification message 210 may include information that identifies that device 108 may act as a bridge between devices 202A and 202B and information such as authentication information, network information, and the like.

At 1108, bridge response message(s) may be received. As discussed above, a device 108 receiving the bridge notification message 210 may or may not want the device to act as a bridge. In some examples, a device 108 may reply with a bridge request message 214 that requests the device 108 act as a bridge device.

At 1110, the device is configured as a bridge device for responding device(s). As discussed above, in some examples, the device establishes itself as a bridge device when requested via the bridge request message 214. From this point forward, any data sent to/received from the device may be forwarded by the bridge device.

FIG. 12 is a flowchart showing a process 1200 for authenticating devices within the groups. Each group can be authenticated autonomously following discovery of the devices that are to form the group.

At 1202, certificate request messages are generated. As discussed above, instead of requiring global pre-assigned keys for authentication, the devices 108 in the group are authenticated with signatures and certificate passing thereby providing strong security. In some configurations, certificate requests are sent after the groups are identified.

At 1204, the certificate requests are transmitted in the mesh network using the established bridge device(s). As discussed above, not all of the devices 108 are directly connected within a group. In these examples, one or more bridge devices 108 act as a proxy to send data.

At 1206, certificates are received from the other devices. As discussed above, the certificates are used to authenticate the devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    determining a network topology that includes devices within a mesh network by performing a network discovery technique for identifying the devices within the mesh network, the devices including at least a first device, a second device, and a third device;
    determining that the second device and the third device are associated with a first group and that the first device is associated with a second group;
    at the first device within the mesh network, identifying that the second device, that is a neighbor of the first device, is wirelessly disconnected from the third device that is a neighbor of the first device;
    establishing the first device as a bridge device that acts as a proxy for at least one of the second device or the third device; and
    using the bridge device to communicate a message to at least one of the second device or the third device, wherein communicating the message via the bridge device reduces repeated rebroadcasts within the mesh network,
    wherein the first device and the second device are smart meters that are connected to transformers in a smart electrical grid.

2. The method of claim 1, further comprising sending, from the first device, a bridge notification message to the second device and the third device that identifies that the first device is available as a bridge device.

3. The method of claim 1, further comprising receiving, by the first device, a bridge request message from at least one of the second device or the third device that requests the first device to act as the bridge device.

4. The method of claim 1, further comprising performing asymmetric authentication to authenticate the first device.

5. The method of claim 1, wherein the first group includes first devices that are attached to a first transformer, and the second group includes one or more second group devices attached to a second transformer.

6. The method of claim 1, further comprising detecting a change to at least one of the first group or the second group, and in response to detecting the change updating a membership of the at least one of the first group or the second group.

7. A system, comprising:
    devices coupled to a mesh network, the devices including at least a first device, a second device, and a third device; one or more processors; and
    one or more computer-readable media storing computer-executable instructions that, when executed, cause the one or more processors of a device to perform operations comprising:
    determining a network topology that includes devices within the mesh network by performing a network discovery technique for identifying the devices within the mesh network;
    determining that the second device and the third device are associated with a first group and that the first device is associated with a second group;
    identifying that the second device, that is a neighbor of the first device, is wirelessly disconnected from the third device that is a neighbor of the first device;
    establishing the first device as a bridge device that acts as a proxy for at least one of the second device or the third device; and
    using the bridge device to communicate a message to at least one of the second device or the third device, wherein communicating the message via the bridge device reduces repeated rebroadcasts within the mesh network,
    wherein the first device and the second device are smart meters that are connected to transformers in a smart electrical grid.

8. The system of claim 7, the operations further comprising sending a bridge notification message to the second device and the third device that identifies that the first device is available as a bridge device.

9. The system of claim 7, the operations further comprising receiving a bridge request message from at least one of the second device or the third device that requests the first device to act as the bridge device.

10. The system of claim 7, the operations further comprising performing asymmetric authentication to authenticate at least one of the first device, the second device, and the third device.

11. The system of claim 7, wherein the first group includes first group devices that are attached to a first transformer, and the second group includes one or more second group devices attached to a second transformer.

12. The system of claim 7, the operations further comprising detecting a change to at least one of the first group or the second group, and in response to detecting the change updating a membership of the at least one of the first group or the second group.

13. A device, comprising:
a communication interface operable to communicate with other devices within a mesh network, the other devices including at least a second device and a third device;
one or more processors; and
one or more computer-readable media storing computer-executable instructions that, when executed, cause the one or more processors of the device to perform operations comprising:
determining a network topology that includes the device and the other devices within the mesh network by performing a network discovery technique for identifying the other devices within the mesh network;
determining that the second device and the third device are associated with a first group and that the device is associated with a second group;
identifying that the second device, that is a neighbor of the device, is wirelessly disconnected from the third device that is a neighbor of the device;
establishing the device as a bridge device that acts as a proxy for at least one of the second device or the third device; and
communicating a message to at least one of the second device or the third device, wherein communicating the message reduces repeated rebroadcasts within the mesh network,
wherein the device, the second device, and the third device are smart meters that are connected to transformers in a smart electrical grid.

14. The device of claim 13, the operations further comprising sending a bridge notification message to the second device and the third device that identifies that the device is available as a bridge device.

15. The device of claim 13, the operations further comprising receiving a bridge request message from at least one of the second device or the third device that requests the device to act as the bridge device.

16. The device of claim 13, wherein the device is connected to a first transformer of the transformers, and the second device and the third device are attached to a second transformer of the transformers.

* * * * *